United States Patent [19]

Otfinoski

[11] Patent Number: 5,024,884
[45] Date of Patent: Jun. 18, 1991

[54] ABRADABLE SEAL HAVING PARTICULATE EROSION RESISTANCE

[75] Inventor: William F. Otfinoski, Meriden, Conn.

[73] Assignee: United Technologies Corporation, Hartford, Conn.

[21] Appl. No.: 9,623

[22] Filed: Jan. 23, 1987

Related U.S. Application Data

[63] Continuation of Ser. No. 686,176, Dec. 24, 1984, abandoned.

[51] Int. Cl.⁵ .................. B32B 5/16; B32B 15/04; B05D 1/06; B05D 1/10
[52] U.S. Cl. .................. 428/328; 415/174.4; 427/34; 427/205; 427/383.5; 427/383.9; 427/421; 427/423; 427/427; 428/336; 428/457; 428/698; 428/704
[58] Field of Search .............. 428/328, 325, 450, 472, 428/446, 457, 668, 553, 336, 698, 704; 427/205, 34, 383.5, 383.9, 423, 427; 106/14.12; 415/174, 173.4, 174.4; 72/199; 75/229; 419/36; 227/153, 53, 96.2, DIG. 6, 235 A; 277/56

[56] References Cited

U.S. PATENT DOCUMENTS

| | | | |
|---|---|---|---|
| 3,084,064 | 4/1963 | Cowden et al. | 427/205 X |
| 3,248,249 | 4/1966 | Collins | 106/14.12 X |
| 3,248,250 | 4/1966 | Collins | 106/14.12 X |
| 3,248,251 | 4/1966 | Allen | 428/450 X |
| 3,350,178 | 10/1967 | Miller | 428/472 X |
| 3,701,536 | 10/1972 | Matthews et al. | 277/56 |
| 3,723,165 | 3/1973 | Longo et al. | 427/423 |
| 3,879,831 | 4/1975 | Rigney et al. | 415/173.4 X |
| 4,039,296 | 8/1977 | Levinstein | 428/353 |
| 4,049,428 | 9/1977 | Elbert et al. | 419/36 X |
| 4,139,376 | 2/1979 | Erickson et al. | 75/229 |
| 4,198,839 | 4/1980 | Linko, III et al. | 72/199 |
| 4,257,735 | 3/1981 | Bradley et al. | 415/174 |
| 4,273,824 | 6/1981 | McComas et al. | 415/173.4 |
| 4,291,089 | 9/1981 | Adamovic | 428/325 |
| 4,319,924 | 3/1982 | Collins, Jr. et al. | 106/14.12 |
| 4,371,589 | 2/1983 | Warner et al. | 428/553 |
| 4,422,648 | 12/1983 | Eaton et al. | 415/174 X |
| 4,503,128 | 3/1985 | Iseti et al. | 428/446 |
| 4,537,632 | 8/1985 | Mosser | 106/14.12 |

Primary Examiner—Thomas J. Herbert
Attorney, Agent, or Firm—C. G. Nessler; J. M. Rashid

[57] ABSTRACT

Porous plasma arc sprayed powder metal abradable materials used in knife edge labyrinth seals of gas turbine engines have their resistance to erosion improved when a thin ceramic surface layer containing fine aluminum particulate is applied. The fine equiaxed particulate and ceramic are applied as an aqueous liquid so that both the particulate and cermic matrix material fill the surface pores, without penetrating further into the powder metal material and thereby adversely affecting desirable abradability characteristics.

14 Claims, 2 Drawing Sheets

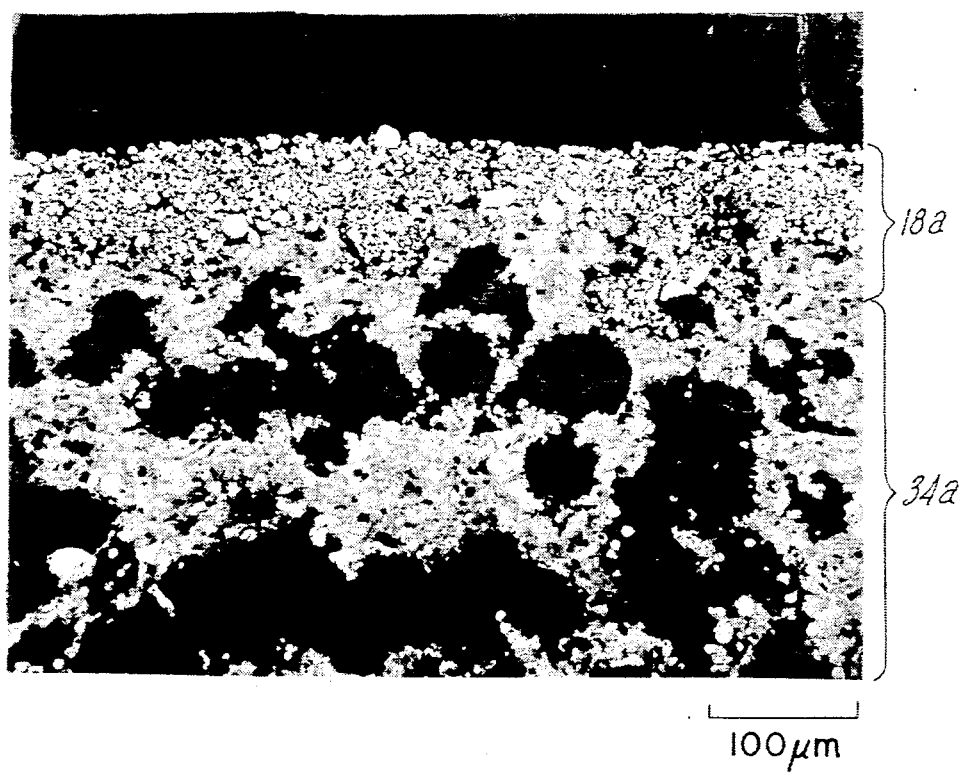

ABRADABLE SEAL HAVING PARTICULATE EROSION RESISTANCE

This Application is a continuation of U.S. Pat. Application Ser. No. 686,176 filed Dec. 24, 1984, now abandoned.

TECHNICAL FIELD

The present invention relates to the field of porous metal structures, particularly those useful as abradable seals in turbomachinery.

BACKGROUND

Abradable seals are used in turbomachinery to maintain very close clearances between spinning blades and the surrounding case structure. They are comprised of materials which are particularly adapted to fragment and disappear when contacted by rotating parts which are spinning at high speeds. As generally mentioned in U.S. Pat. Nos. 3,879,831 to Rigney et al, 3,084,064 to Cowden et al and 4,257,735 to Bradley et al, abradable seals must have a particular combination of properties. They must be resistant to erosion from high velocity gas streams which at times carry with them fine particulates while at the same time being capable of disintegrating when contacted by the tip of a high speed blade or by a knife edge of a labyrinth rotating shaft seal, so such parts are not substantially degraded. Such a mode of behavior is highly desirable because at times a rotating part of an engine and surrounding casing having the abradable seal may come together too closely. When this occurs locally around the circumference, it is highly desirable that the casing having the abradable seal sustain all the wear so that the clearance between the rotating part and the case elsewhere around its circumference will not be increased and leakage will not be unduly increased.

Abradable seals in the compressor part of gas turbine engines are generally used at 540° C. or less and thus, they are usually comprised essentially of metal. For example, U.S. Pat. No. 3,350,178 to Miller describes how a porous metal structure is made by combining a fugitive polymer with metal particles and suitably sintering the mass. Commercial products of sintered powder metals may in fact be presently used in certain engines. Another type of seal material is a mat of metal fibers having a felt-like construction. This type of material is described in the aforementioned Bradley et al patent and U.S. Pats. No. 3,701,536 to Matthews et al, 4,139,376 to Erickson and 4,273,824 to McComas et al. To some, the fiber metal configuration is preferred because of the more continuous nature of the wrought wire structure, compared to a powder metal product. As indicated in the patents referred to, such fiber metal structures may have densities in the range of 10–50 percent, more typically 14–35 percent; but for use with knife edges they have densities in the range 14–23 percent. Thus, fiber metal seals tend to be less dense than the sprayed powder metal seals which are the subject of the present invention. In fact, sprayed powder metal seals cannot feasibly be made with so little density and still function effectively.

As just suggested, abradable seal material has also been made by plasma arc spraying, and it is with such kinds of seals that the present invention is particularly concerned. Plasma arc spraying of abradable materials is described in the aforementioned Cowden et al patent, the disclosure of which is hereby incorporated by reference. Different users have their varying preferences among the foregoing kinds of abradable seal materials. Generally, there is a preference for the seal materials made out of powder metals because powder metals tend to be more readily available in diverse compositions and tend to be lower in cost than fiber metals. There are technical differences in performance between the different kinds of seals and it was to overcome a deficiency of the seals made from sprayed powder metal, that the present invention came about.

Pat. application Ser. No. 565,542 filed on Dec. 27, 1983 by the present applicant and others, now U.S. Pat. No. 4,759,957 describes in detail the way of making a porous metal abradable material by plasma arc spraying nichrome powder and polymethyl methacrylate powders. The seal material referred to in the application is an improvement on the general kind of material which can be made by plasma arc spraying in which a metal powder and a fugitive polymer powder are sprayed onto a substrate. Heating is then used to drive away the polymer; when 80 Ni 20 Cr metal is sprayed the resultant structure has a density of about 26–40 percent of the parent metal.

Sprayed seals of the foregoing type are cost effective and can be quite useful, although they continue to undergo development and refinement. While they generally do perform the function that is set forth above, it has been observed that there is sometimes a propensity in knife edge labyrinth seals for the seal material to prematurely disappear from the place where it has been deposited. Such an effect would not be surprising if it were confined to the region where the seal material tends to be contacted by the rotating knife edges, as illustrated in the Bradley and Matthews et al patents. However, disappearance of the material has been noted in regions where there is no possibility of contact or interaction with the rotating parts, specifically, in the portion which is between two spaced apart circumferential outside diameter knife edges, e.g., region 27 in FIG. 3 of the Matthews patent, being the same as 36 in FIG. 1 herein. And when the material between the knives disappears, this apparently makes the remaining material more prone to being undercut and to being unacceptably disintegrated. The clearances between the rotating part and the circumbscribing static structure become greatly excessive and there is undue leakage and resultant loss in efficiency of the turbomachine.

Research was undertaken to identify the cause of the observed limitation. The failure mode was associated with the plasma arc sprayed seal and was not observed in a similarly placed substitutional fiber metal seal. Further, the failure was only observed when the plasma arc sprayed deposit was confined between the two knife edges of a labyrinth type seal and it was not particularly observed in a more prevalent application where the abradable material is contacted by rotating blades. While identifying the mode of failure was difficult owing to the conditions under which it occurs, the opinion has been formed that the cause is "self-erosion" (also called "auto-erosion"). It appears that particulate matter which comes loose from the abradable seal material in the ordinary course of operation will not flow downstream through the machine as one might expect. Instead, this particulate is trapped and is thrown outwardly by centrifugal force between the knife edges. As it rotates circumferentially around the interior of the circumscribing structure, the quantity and impact of the debris is evidently sufficient to degrade the seal material surface. More particles are dislodged and in a very short time there is a "chain reaction" which causes a substantial amount of the abradable seal material to disappear. The phenomenon is peculiar to circumstances where the particulate are trapped between knive edges. The effect is not observed in situations where there is significant leakage across the sealed region, such as where the knife edge seal is eccentric with the circumscribing abradable material, or when spaced apart blade tips contact the material. This supports the hypothesis since it is supposed that under such conditions the abraded away and other foreign particles known to be present are able to flow away downstream.

Consequently, there has been a search for ways to improve seal materials to make them resistant to self erosion. However, as mentioned above there is a paradox in the materials engineering design of seals in that if they are made stronger in order to become more resistant to particulate erosion, then they also tend to become less functional in that they will not be as abradable and instead will unacceptably wear away the knife edges.

DISCLOSURE OF THE INVENTION

An object of the invention is to improve the characteristics of powder metal seals, so that they perform comparably to fiber metal seals, in resisting erosion when particles are trapped between adjacent multiple knife edges. Another object of the invention is to have an abradable seal which is resistant to particulate erosion but at the same time does not cause undue wear to knife edges which penetrate its surface.

According to the invention, the erosion resistance of a porous powder metal abradable seal material, such as plasma arc sprayed nichrome, is improved by applying to its surface a layer of material which is comprised of a water soluble ceramic and fine equiaxed particulates. In a preferred embodiment of the invention, the layer is applied as an aqueous mixture containing phosphate and other anions and fine rounded aluminum particulate. As-applied, the material has a viscosity and other properties such that it flows into the surface pores of a powder metal abradable, while not penetrating further into the bulk of the abradable material. A layer of about 0.050 mm thick containing about 50 weight percent particulate is formed on the surface. After heat curing, the layer is very smooth and adherent and even at temperatures up to 540° C. resists erosion. The excellent erosion resistance is attributable to the layer properties and how it infiltrates into the comparatively large surface pores.

Typically, an abradable seal structure will have a density of 26-40 percent of the parent metal. Preferably, the particulate in the erosion resisting surface layer is a metal having a hardness no greater than the hardness of the metal of the seal structure.

The invention is applicable to powder metal seal substances of all types, but is particularly useful with those made by plasma arc spraying. Such kinds of abradable materials are characterized by a relative lack of permeability, compared to fiber metal seals, even in the vicinity where the knife edges wear through the thin surface layer during the course of ordinary use.

The foregoing and other objects, features and advantages of the present invention will become more apparent from the following description of preferred embodiments and accompanying drawings.

BRIEF DESCRIPTION OF THE DRAWINGS

FIG. 3 is a photomicrograph showing a portion of the abradable material, specifically a plasma sprayed deposit having thereon a thin ceramic and metal layer for imparting erosion resistance.

BEST MODE FOR CARRYING OUT THE INVENTION

The present invention is described in terms of a nichrome alloy plasma sprayed seal used in the compressor part of a gas turbine engine. However, the principles of the invention will be pertinent to seals made of other materials, which seals have a structure similar in character to plasma sprayed seals, and which may be used in diverse applications.

Figure 1:
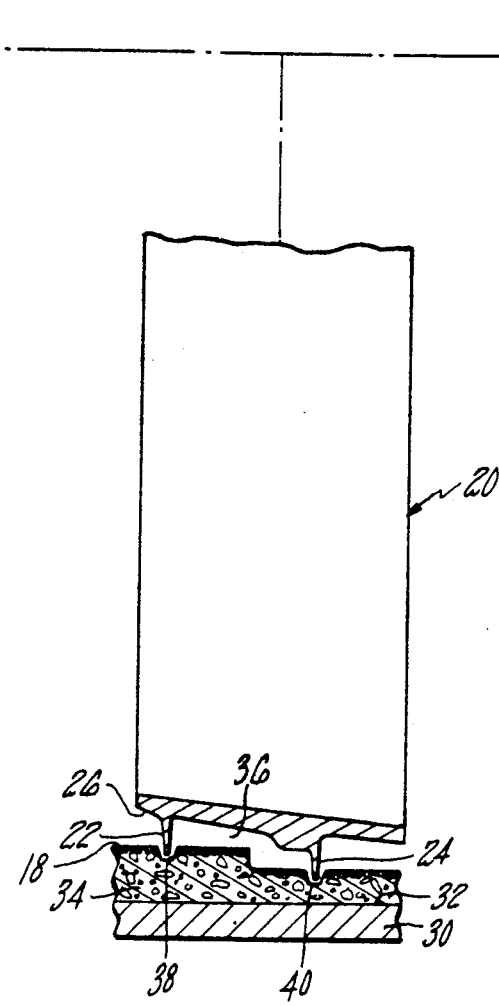
FIG. 1 shows a diametrical cross section of a circumferential abradable seal structure, wherein a ring of abradable seal material surrounds a rotating gas turbine engine part having two knife edges on its outer circumference.

FIG. 1 shows a partial longitudinal cross section along the diameter of a rotating metal structure 20 of a gas turbine engine. The structure has two circumferential fins 22, 24 commonly called knife edges, running around its outer circumference 26. The structure rotates around its centerline 28 and may have a diameter of about 530-660 mm when it is part of a fairly large gas turbine engine. Circumbscribing the rotating structure 20 is a static circular ring 30; lining the inside circumferential surface 32 is the abradable seal material 34. In FIG. 1, the knife edge seals 22, 24 have different radii and thus the seal material is shown to be a stepped structure. As an actual example of the parts shown in the Figure, the knife edges are on an engine shaft and the abradable material lines the bore or inside diameter shroud of a stator or vane assembly.

Normally, the seal shown in FIG. 1 resists flow of gases in the axial direction, e.g., from the right of knife 24 toward the left of knife 22. As shown in the Figure, the knife edges wear small grooves 38, 40 in the surface of the abradable material. As is typical, the grooves are shown to be somewhat bigger than the knife edges because of relative axial and radial transient motions between the parts 20 and 30. As described in the Background, the character of the abradable material and the layer 18 must be such as to be penetrated by the knife edges 22, 24 without causing undue wear to them. Often the knife edges will have a thin abrasion resisting coating, such as alumina, to reduce wear.

From FIG. 1 it will be seen that the region 36 between the knife edges 22, 24 is an annular space within which particulates can become entrapped. Such particulates may become present by being worn away from the grooves 38, 40. Under high speed rotation of the structure 20, the particulates presumably assume a circumferential motion during which they impinge against the abradable seal material, and thus are believed to cause the observed excessive wear of the abradable material within the annular space.

Figure 2:
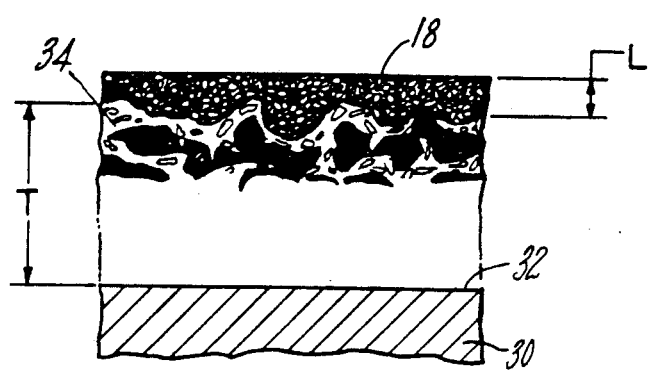
FIG. 2 is a more detail view of the abradable material part of the seal shown in FIG. 1, indicating the thin layer on the surface thereof.

FIG. 2 is a more detail view of a part of the ring and abradable material thereon. The abradable material is a plasma sprayed nichrome metal deposit having a thickness T, as more particularly described below. On the surface of the material is a thin layer 18 of thickness L, which layer is comprised of a polymerized ceramic matrix containing a rounded particulate filler.

The plasma sprayed abradable seal is preferably made according to the method described in commonly owned co-pending U.S. patent application Ser. No. 565,541 filed on Dec. 27, 1983 by Eaton and Novak, now U.S. Pat. No. 4,664,973; the disclosure of which is hereby incorporated by reference. As disclosed therein, a mixture of 80Ni-20Cr nichrome metal powder and polymer powder is first sprayed to form a sprayed deposit. Preferably, the Tyler Sieve Series mesh size of the metal powder is between 250-500 mesh, while the polymer powder is between 80-400 mesh (0.175-0.038 mm), and the sprayed deposit contains 37-43 volume percent polymer. The deposit is then heated to cause the polymer to flee by endothermic reaction. Preferably, polymethyl methacrylate fugitive polymer material is used because it flees upon heating to a temperature of less than 540° C., and this produces a seal having less than 30 weight percent oxide content. (Less preferably, the method disclosed by Longo et al in U.S. Pat. No. 3,723,165 may be used to form the deposit, and the disclosure of the patent is hereby incorporated by reference. When a deposit is formed according to the method of Longo et al, the polyester resin must be removed by heating the sprayed deposit in an oxidizing atmosphere, resulting in a higher oxide content which diminishes abradability over the preferred method.)

After the polymer is caused to flee, the sprayed deposit will be comprised of a porous metal structure comprised of a multiplicity of frozen droplets adhered to one another. Such a structure 34a is shown in the photomicrograph of FIG. 3. The dark areas are pores, while the light areas are the frozen droplets adhered to one another. Preferably, the porous metal plasma sprayed deposit which comprises the abradable seal has a density of at least 26 percent, preferably 30-32 percent. The percent density reflects the weight per unit volume of the abradable seal material, compared to the density of the solid material of which it is composed. The structure will have a Rockwell Z superficial hardness number of 45-85, preferably 50-75 (using a 10 kg load).

It will be noted that the pores are large, having a size resulting from the above mentioned polymer particulate size and proportion. And they have a spherical shape which is importantly related to a relatively low oxide content. Of course, the abradable seal may be made of other materials, including other nichrome (nickel-chromium in various proportions) alloys and the family of coating materials known as MCrAlY (where M is typically a metal selected from the group comprised of Fe, Co, and Ni and mixtures thereof). See U.S. Pats. No. 3,676,085, 3,754,903 and 3,542,530. The nominal thickness T of sprayed deposit abradable seal material 34, 34a may be typically 0.8-6 mm although it can be lesser or greater than that amount.

There is a layer 18, 18a on the surface having a typical thickness of 0.025-0.075 mm and special properties. The layer is applied as an aqueous solution and is cured by air drying at 100-425° C. Preferably, the layer material is a commercial coating compound such as Sermetel W (Sermetech Inc., North Wales, PA) or Alseal 500 (Coatings for Industry Inc., Souderton, PA). Such materials are generally described in U.S. Pats. No. 3,248,249 and 3,248,250 to Collins, 3,248,251 to Allen and 4,319,924 to Collins Jr., et al., the disclosures of which are hereby incorporated by reference. Generally, the Sermetel W coating material is a species of the Allen patent material which is comprised of about 50 weight percent minus 400 Tyler Sieve Series mesh aluminum powder (typically about $10^{-5}$ m average particle size) and about 50 percent aqueous material containing dissolved phosphate, dichromate or molybdate. Optionally, dissolved metal is included in the aqueous material which is applied.

Generally, the Alseal 500 material is a species of the Collins Jr. et al material, and an improvement on the Allen material which cures at a lower temperature of about 100-150° C. It contains water, dissolved phosphate, dissolved dichromate, dissolved aluminum, solid particulate aluminum, and diethenolamine.

The foregoing materials have water as a diluent/solvent. They are applied at about 20-25° C. and are cured by driving off the water; slight or substantial heating causes polymerization.

Because of the character of the liquid material which is used, the cured layer 18, 18a lies on the surface despite the plasma sprayed material having substantial internal porosity, as described above and as shown in the FIG. 3 photomicrograph. However, compared to fiber metal seal material, the porosity of the powder metal material of the present invention is less open and more tortuous. Compare the photomicrographs of U.S. Pat. No. 4,273,824 to McComas et al, the disclosure of which is hereby incorporated by reference, with the plasma spray coating depicted in FIG. 3. And, the Sermetel W and Alseal 500 materials each have a viscosity of about 16-18 seconds at 25° C. using a No. 2 Zahn cup. Thus, when a Sermetel W or Alseal 500 coating composition is applied by brushing or spraying to the surface of a plasma sprayed seal, it is found that the coating does not significantly penetrate the porous plasma sprayed deposit, but that it tends to lay and flow on the surface as shown in the Figures. Yet is seen that the fine aluminum particulates (and matrix which is not visible except as dark spaces) penetrate the large surface pores which characterize the invention abradable material. This characteristic is highly desirable and indeed necessary as described below. While the aqueous solutions mentioned are desired, binder systems having other bases may be used, provided they allow the aforementioned penetration and produce a matrix of suitable thermal and mechanical durability.

The layer 18, 18a is inorganic and when cured it is comprised of a ceramic layer within which are trapped fine aluminum particulates. The light colored densely packed equiaxed and rounded aluminum particulates can be seen in the layer 18a in FIG. 3. They are surrounded by the ceramic matrix which appears dark. Of course, other metals may be substituted for the aluminum, although it has been found that the aluminum works well. As is well known aluminum as a metal tends to be softer and less abrasion resistant than a metal such as 80Ni-20Cr. Thus, the improved erosion resistance which is described below is believed to be due to the properties of the matrix material, the smooth surface obtained, and the interaction of the layer particulate with the surface pores of the substrate abradable material.

Table 1 shows the relative performance of certain plasma arc sprayed nichrome abradable seal structures in controlled tests. A rig simulating the structure shown in FIG. 1 was constructed and controlled amounts of particulate material were caused to become present in the space between the knife edges. The wear on the abradable seal material and on the knife edges was measured.

TABLE 1

Performance of Plasma Arc Sprayed Nichrome Abradable Seal Structures in Contact with Knife Edges

| | Metal | Condition Variable | Erosion Wear | Knife Edge Wear |
|---|---|---|---|---|
| A | NiCr | soft deposit ($R_{10}Z$ 50-65) | high | low |
| B | NiCr | hard deposit ($R_{10}Z$ 65-75) | high | low |
| C | NiCr | polyester in voids | nil | high |
| D | NiCr | glazed metal surface | low | nil |
| E | NiCr | Aluminum-ceramic surface layer | nil | nil |
| F | | 19% dense Hastelloy X fiber metal | nil | nil |

Referring to the Table, lines A and B represent base line tests and show that erosion is high regardless of deposit $R_{10}Z$ hardness. Line C shows that when the relatively soft polyester of the Longo et al patent was left in the voids there is good erosion resistance but unacceptable wear of the metal edges. This is interesting because the polyester is obviously softer than a metal knife edge. It shows the necessity in the invention of having voids in a seal material beneath the thin surface layer coating. Line D represents a condition where the plasma sprayed abradable surface is purposely glazed over by the use of particular machining conditions. (In abradable seals which are not subjected to self-erosion, it is known that such a glazing is to be avoided by use of the proper machining conditions because knife edge wear is increased.) The glazed surface had relatively good erosion resistance, but there was some wear and it was not possible to get 100 percent glazing; thus there was erosion, albeit lower than without glazing. Line E shows good comparative results from an example of the present invention; the performance of such seals was verified by running actual engine tests. Line F illustrates the performance of a typical prior art fiber metal seal, based on actual engine experience. It shows there is no need for a surface layer coating to alleviate self-erosion.

The viscosity of the material and porosity of the abradable material to which the layer material is applied are interrelated. As the test data at line C in Table 1 show, when there is a filling in the interstices of the abradable material, the abradable material will lose its desirable abradability. Thus, too low a liquid coating viscosity, too open a plasma spray abradable material, or incorrect application procedures which will fill the pores and will not work. The familiar process of impregnating porous substances with polymers, often applied to powder metal articles, would be not appropriate.

Further, to avoid undue wear to the knives, the particulate in the layer must be a material which is readily penetrated by the knife which is typically made of a wrought iron, nickel or titanium alloy, even when the knife has a thin protective layer. This precludes putting materials in the layer which are by nature abrading, e.g., silicon carbide, alumina, etc. The particulate is preferably aluminum, although other metals are substitutional. Non-metals such as boron nitride and molybdenum disulfide may be used also. Generally, the particulate will be of a composition which is different from and insoluble in the liquified matrix material. As noted, it is important that the particulate be sufficiently small and shaped so that it infiltrates the surface pores.

The surface layer thickness which is useful depends on the severity of the wear problem and the life expectancy of the seal. Thickness of 0.025-0.225 mm were evaluated. Typically 0.025-0.13 mm has been found to be sufficient, with 0.025-0.08 mm being preferred. If too thin, then unacceptable erosion resisting benefit is obtained. If too thick, then knife edge wear tends to be increased unacceptably (and of course under this circumstance the seal structure also fails to perform its function).

The present invention has some resemblance to the invention of Bradley et al, disclosed in U.S. Pat. No. 4,257,735. The Bradley invention uses a fiber metal abradable seal of rather low 14-22 percent density. An organic coating layer of silicone resin and aluminum powder is applied to the surface to stop air permeation. While in the preferred embodiment of the Bradley invention the layer comprises the organic matrix (polymer), it is said that heating the layer to 315° C. for two hours converts the silicone to a silica, thus providing a higher temperature ceramic layer.

The present invention can be contrasted with the Bradley invention in that the layer which is deposited is inorganic and does not require heating to a high temperature. It is therefore useful at comparatively low temperatures. And, tests run in accord with the teachings of the Bradley et al patent have shown other criticalities in the present invention. As an example, a commercial silicone resin filled with aluminum particulate, (Hi-Heat Resistant Aluminum Paint K7897 of Pratt & Lambert, Buffalo, N.Y., USA), was applied to the surface of a plasma sprayed seal material of the kind used in the invention. Although the film was adherent as an organic material, when specimens were heated to 315° and 540° C., the film became flaky and subject to easy dislodging. Erosion tests were not run because the results would be predictably bad. Microexamination showed the coating material to have a flake particulate, characteristic of paints. The particulate, although fine in its equivalent spherical particle size, did not penetrate the surface pores of the plasma coating as do the fine round particles of the aqueous base coatings used in the present invention. Thus it was concluded that there is obtained in the present invention a very good mechanical interlock which is not obtained with other materials.

These poor results do not mean full credit might be given to the results in the Bradley et al patent (even though no test data are presented). While no comparative tests have been run in connection with this application, a coating having a platelet particulate probably will adhere better to the more open structure which characterizes fiber metal abradables.

In other ways, the plasma arc coatings of the present inventions are quite distinct from the highly permeable fiber metal seals of the Bradley et al invention. The open appearance of fiber metal compacts having a high density (of about the same nominal 30% density of the present inventions material) is shown in the McComas patent; and, the lower density Bradley et al fiber metal would obviously be even more open. Fiber metal seals are of necessity permeable to a high degree because a low density is necessary to obtain the desired abradability. Since plasma arc sprayed deposits are relatively impermeable compared to fiber metals which they replace in knife edge seal applications, the air leakage problem mentioned in the Bradley et al patent has not been noted in sprayed abradable seals.

Another difference is that as fiber metals are not comprised of bonded together particulates which can easily break away; there has been no reason to apply coatings to them for self erosion protection. The probable reason for self-erosion problems in powder metal abradable seal materials is that the adhesion between the particulates is less strong than the adhesion between fibers.

While the invention herein has been primarily described in its application to plasma sprayed seal materials, it will be applicable as well to other powder metal seal materials made of bonded together particulate, such as are made by prior art techniques including those mentioned in the Pat. No. 3,350,178 to Miller and 4,049,428 to Elbert.

Although this invention has been shown and described with respect to a preferred embodiment, it will be understood by those skilled in the art that various changes in form and detail thereof may be made without departing from the spirit and scope of the claimed invention.

I claim:

1. An abradable seal structure of the multiple knife edge type comprises of a porous powder metal plasma arc sprayed deposit having 26-40 percent density on a metal substrate, wherein the deposit is characterized by having interlocked to its surface a layer material comprised of equiaxed particulates in a ceramic matrix, wherein the hardness of the particulates is no greater than the hardness of the metal of said sprayed deposit; the particulates are substantially smaller than the surface pores of said sprayed deposit, and some of said particulates are contained within said surface pores; sand said layer material improves the resistance of said sprayed deposit to erosion when the seal is rubbed by said knife edges.

2. The seal of claim 1 characterized by the layer having a thickness of at least 0.025 mm.

3. The seal structure of claim 1 characterized by the ceramic material selected from the group comprised of metal phosphates, metal chromates, and mixtures thereof.

4. The seal of claim 1 characterized by the porous powder metal deposit being a plasma arc sprayed nichrome alloy, and the matrix being a material selected from the group comprised of phosphates, metal chromates, and mixtures thereof.

5. The seal of claim 1 characterized by the particulate being aluminum, boron nitride or molybdenum disulfide.

6. The method of improving the erosion resistance of a porous powder metal abradable seal having greater than 26 percent density percent on a metal substrate, comprising the step of applying to the seal surface a layer material comprised of liquid and fine equiaxed metal particulates; flowing the layer material into the surface pores of the seal without flowing said material into the pores beneath the surface; and curing said material to form on the surface of the seal a layer comprising metal particulates in a ceramic matrix wherein the hardness of the metal particulates is no greater than the hardness of the metal of the abradable seal.

7. The method of claim 6, wherein the step of heating is done after the step of applying the layer material to the plasma sprayed deposit.

8. The method of claim 6 characterized by curing the layer by heating to 100°–425° C.

9. The method of claim 6 wherein the abradable seal material lies on the surface of a circular turbomachine structure.

10. The method of claim 6 wherein the seal material is a plasma arc sprayed deposit having a density of 26–40 percent and the cured layer is 0.025–0.13 mm thick.

11. The method of claim 10 characterized by a layer 0.025–0.08 mm thick.

12. The method of claim 10 characterized by the seal material being made of plasma arc sprayed nichrome metal.

13. The method of claim 6 characterized in that the layer material consists essentially of particulates suspended in an aqueous solution containing phosphate anion, an anion selected from the group consisting of anions of chromate, molybdate and mixtures thereof, and a metal cation; and, then curing the layer to a water insoluble material by heating.

14. The method of claim 13 characterized by a plasma arc sprayed abradable seal material and aluminum metal particulates having about $10^{-5}$ m average particle size.

* * * * *